US009892581B2

(12) United States Patent
Kang et al.

(10) Patent No.: US 9,892,581 B2
(45) Date of Patent: Feb. 13, 2018

(54) VEHICLE DOOR CONTROL SYSTEM AND OPERATING METHOD THEREOF

(71) Applicant: HYUNDAI MOBIS Co., Ltd., Yongin-si, Gyeonggi-do (KR)

(72) Inventors: Jong Joo Kang, Gunpo-si (KR); Joung Ho Han, Yongin-si (KR); Jae Kwang Kyung, Yongin-si (KR)

(73) Assignee: HYUNDAI MOBIS Co., Ltd., Yongin-si (KR)

( * ) Notice: Subject to any disclaimer, the term of this patent is extended or adjusted under 35 U.S.C. 154(b) by 0 days.

(21) Appl. No.: 15/377,693

(22) Filed: Dec. 13, 2016

(65) Prior Publication Data

US 2017/0263066 A1 Sep. 14, 2017

(30) Foreign Application Priority Data

Mar. 10, 2016 (KR) ........................ 10-2016-0029027

(51) Int. Cl.
*G05B 19/00* (2006.01)
*G07C 9/00* (2006.01)

(52) U.S. Cl.
CPC ..... *G07C 9/00309* (2013.01); *G07C 9/00896* (2013.01); *G07C 2009/00769* (2013.01)

(58) Field of Classification Search
CPC ............ G07C 9/00309; G07C 9/00896; G07C 2009/00769
USPC ................... 340/5.61, 5.6, 438, 539.13, 907; 455/41.1, 411, 418, 456.4, 557
See application file for complete search history.

(56) References Cited

U.S. PATENT DOCUMENTS 9,627,764 B2 * 4/2017 Kubo ................. G06K 7/10336
9,632,201 B2 * 4/2017 Knizhnik ............... G01V 3/104
2009/0284345 A1 * 11/2009 Ghabra ................... B60R 25/24 340/5.61
2010/0071427 A1 * 3/2010 Tsuruta ................. B60R 25/241 70/237
2014/0098958 A1 * 4/2014 Kawamura ............. B60R 25/24 380/277
2014/0378049 A1 * 12/2014 Takeuchi .............. H04W 4/023 455/41.1
2016/0332635 A1 * 11/2016 Holub ................... B60W 50/08

* cited by examiner

*Primary Examiner* — Dhaval Patel
(74) *Attorney, Agent, or Firm* — Knobbe Martens Olson & Bear LLP

(57) ABSTRACT

Disclosed is a vehicle door control technology such as a vehicle door control system. The vehicle door control system includes a communication unit configured to wirelessly communicate with a smart key or a portable terminal located around a vehicle, a controller configured to communicate with the smart key or the portable terminal using the communication unit, perform authentication on the smart key or the portable terminal based on a received signal, and output a door control signal for controlling a vehicle door when the authentication is successful, and a motor driver configured to lock or unlock the vehicle door according to the door control signal.

13 Claims, 6 Drawing Sheets

VEHICLE DOOR CONTROL SYSTEM AND OPERATING METHOD THEREOF

CROSS-REFERENCE TO RELATED APPLICATION

This application claims priority to and the benefit of Korean Patent Application No. 2016-0029027, filed on Mar. 10, 2016, the disclosure of which is incorporated herein by reference in its entirety.

BACKGROUND

1. Field of the Invention

The present invention relates to a vehicle door control technique, and more particularly, to a vehicle door control system configured to control a vehicle door using a portable terminal and an operating method thereof.

2. Discussion of Related Art

Recently, a vehicle smart key system is tending to be widely used, and a smart key is typically called "FOB key."

A smart key system refers to a system installed in a vehicle to detect an action taken while a user is carrying the smart key and then control an operation of the vehicle.

A smart key system includes a smart key and a smart key electronic control unit (hereinafter referred to as SMK ECU) of a vehicle. Here, the smart phone and the SMK ECU communicate through respective built-in communication modules.

According to a conventional smart key system, when a user intends to control locking and unlocking of a vehicle door, the user should approach the vehicle while carrying a smartphone and control a passive switch located at a door handle.

In more detail, for a conventional door control system using a smart key, when a driver carrying a smart key pushes a passive switch placed at a door, an LF signal is transmitted to the smart key through an LF antenna placed at a door handle. When the smart key receives the LF signal and then transmits a response signal to an SMK ECU via radio frequency (RF), the SMK ECU controls a vehicle door to be locked or unlocked.

As described above, in the field of the vehicle door control, the smart key system provides the vehicle door control.

Accordingly, since the smart key system provides a vehicle door control function through authentication of a smart key carried by a driver, there is an inconvenience that the driver must carry a smart key to utilize the conventional smart key system.

SUMMARY OF THE INVENTION

The present invention is directed to providing a vehicle door control system configured to control a vehicle door using a portable terminal and an operating method thereof.

According to an aspect of the present invention, there is provided an vehicle door control system including a communication unit configured to wirelessly communicate with a smart key or a portable terminal located around a vehicle; a controller configured to communicate with the smart key or the portable terminal using the communication unit, perform authentication on the smart key or the portable terminal based on a received signal, and output a door control signal for controlling a vehicle door when the authentication is successful; and a motor driver configured to lock or unlock the vehicle door according to the door control signal.

The communication unit may include a first communication unit configured to perform low frequency (LF) communication with the smart key; a second communication unit configured to perform radio frequency (RF) communication with the smart key; and a third communication unit configured to perform near field communication (NFC) communication with the portable terminal.

The controller may control the first communication unit to transmit an LF discovery signal for discovering the smart key at every first interval and may control the third communication unit to transmit an NFC discovery signal for discovering the portable terminal at every second interval.

The controller may control the third communication unit to transmit the NFC discovery signal a predetermined number of times and may control the first communication unit to transmit the LF discovery signal when the portable terminal is discovered during transmission of the NFC discovery signal.

The first interval and the second interval may be set different from each other, and the second interval may be set shorter than the first interval.

The controller may determine whether an ID included in a response signal transmitted from the portable terminal discovered by the NFC discovery signal matches a preset ID and may output the door control signal when the two IDs match.

A first antenna connected to the first communication unit and a third antenna connected to the third communication unit may be produced in one body to form an antenna module.

The antenna module may be installed at a door handle of the vehicle.

The antenna module may be formed to have a first antenna coil wound on a ferrite core in one direction and a third antenna coil wound on the ferrite core in another direction.

The antenna module may be formed to have the third antenna coil wound on the ferrite core on which the first antenna coil has already been wound.

The antenna module may be formed to have the first antenna coil wound on the ferrite core on which the third antenna coil has already been wound.

According to another aspect of the present invention, there is provided a method of operating a vehicle door control system, the method including transmitting an NFC discovery signal for discovering a portable terminal at every first interval; counting the number of transmissions of the NFC discovery signal when the NFC discovery signal is transmitted; determining whether the portable terminal has been discovered; and controlling a vehicle door when it is determined that the portable terminal has been discovered, based on a result of authentication of the discovered portable terminal.

The determining of whether the portable terminal has been discovered may be performed based on whether a response signal transmitted by the portable terminal that has received the NFC discovery signal is received.

The controlling of a vehicle door may include performing authentication on the discovered portable terminal; determining whether the authentication is successful from the authentication result; and controlling the vehicle door when it is determined that the authentication is successful.

The performing of authentication on the discovered portable terminal may include comparing an ID included in the response signal transmitted from the portable terminal that has received the NFC discovery signal with a preset ID.

The method may further include determining whether a count value is equal to or greater than a predetermined value with respect to the number of transmissions of the NFC discovery signal when it is determined that the portable terminal has not been discovered; and transmitting the NFC discovery signal at every first interval when it is determined that the count value is less than the predetermined value.

The method may further include transmitting an LF discovery signal for discovering a smart key at every second interval when it is determined that the count value is equal to or greater than the predetermined value; initializing the count value with respect to the number of transmissions of the NFC discovery signal; determining whether the smart key has been discovered; and controlling the vehicle door when it is determined that the smart key has been discovered, based on a result of authentication of the discovered smart key.

The method may further include transmitting the NFC discovery signal at every first interval when it is determined that the smart key has not been discovered.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
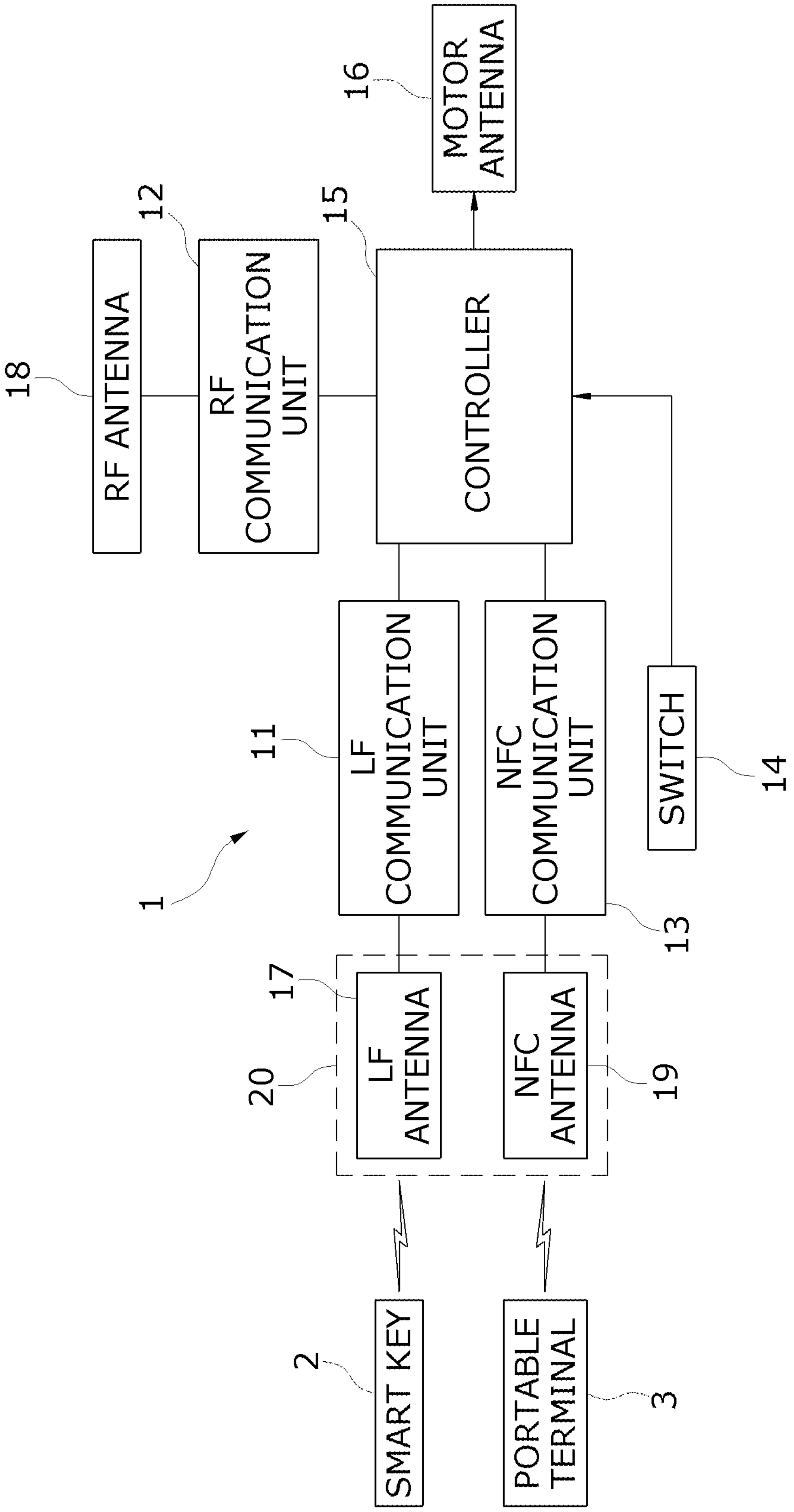
FIG. 1 is a block diagram showing a configuration of a vehicle door control system according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

In the following description, when the detailed description of the relevant known functions or configurations is determined to unnecessarily obscure the important point of the present invention, the detailed description will be omitted. Also, terms used herein are defined in consideration of the functions of the present disclosure and may be changed depending on a user, the intent of an operator, or a custom. Accordingly, the terms must be defined based on the following overall description of this specification.

Hereinafter, a vehicle door control system and an operating method thereof according to an embodiment of the present invention will be described in detail with reference to the accompanying drawings.

FIG. 1 is a block diagram showing a configuration of a vehicle door control system according to an embodiment of the present invention.

Referring to FIG. 1, a vehicle door control system 1 according to an embodiment of the present invention is configured to control locking and unlocking of a vehicle door through authentication of a smart key 2 or a portable terminal 3 placed around a vehicle.

To this end, the vehicle door control system 1 may include at least one or more processor for performing functions and a memory for storing information needed to perform the functions or a result of the performance.

In particular, the vehicle door control system 1 performs low-frequency (LF) communication and radio-frequency (RF) communication with the smart key and performs near-field communication (NFC) communication with the portable terminal 3.

To this end, the smart key 2 includes an LF communication unit and an RF communication unit and stores its own identity (ID), and the portable terminal 3 includes an NFC communication unit and stores its own ID.

In this case, the portable terminal 3 may be, for example, a smartphone, but may also include a notebook computer, a digital broadcasting terminal, a personal digital assistant (PDA), a portable multimedia player (PMP), an e-book terminal, etc.

Also, the vehicle door control system 1 includes an LF communication unit and an RF communication unit for communicating with the smart key 2 and an NFC communication unit for communicating with the portable terminal 3 and stores the ID of the smart key 2 and the ID of the portable terminal 3.

The vehicle door control system 1 according to an embodiment of the present invention will be described below in detail. The vehicle door control system 1 may include a first communication unit 11, a second communication unit 12, a third communication unit 13, a switch 14, a controller 15, and a motor driver 16. The configuration shown in FIG. 1 is an example of the vehicle door control system 1 according to an embodiment of the present invention. Thus, the configuration of the vehicle door control system 1 is not limited to that shown in FIG. 1 and may further include elements other than the aforementioned elements.

In this case, signal transmission or reception between the elements of the vehicle door control system 1 may be performed based on Control Area Network (CAN) communication.

The first, second, and third communication units 11, 12, and 13 communicate with the smart key 2 or the portable terminal 3 using at least one of wireless communication technologies such as a radio frequency (RF), low frequency (LF), and near field communication (NFC) in order to check the presence (search and authentication) of the smart key 2 or the portable terminal 3.

The first, second, and third communication units 11, 12, and 13 transmit signals to the smart key 2 or the portable terminal 3 according to functions of the communication units or receive a signal transmitted from the smart key 2 or the portable terminal 3 and then deliver the received signal to the controller 15.

To this end, the first, second, and third communication units 11, 12, and 13 are connected with first, second, and third antennas 17, 18, and 19, respectively. The first, second, third communication units 11, 12, and 13, and the first, second, and third antennas 17, 18, and 19 will be described in detail later.

Meanwhile, the switch 14 generates a signal (press signal) according to external manipulation (a switch press) and sends the generated signal to the controller 15. As an example, the switch 14 may be a passive switch installed at a door handle.

Also, the controller 15 authenticates the smart key 2 or the portable terminal 3 on the basis of the signal sent from the switch 14 and the signal received through the communication units 11, 12, and 13 and outputs a door control signal.

Also, the controller 15 may control the first and third communication units on the basis of transmission intervals of discovery signals of the first and third communication units 11 and 13.

As an example, the controller 15 may authenticate the portable terminal 3 on the basis of a signal received through the third communication unit 13 or may authenticate the smart key 2 on the basis of signals received through the first communication unit 11, the second communication unit 12, and the switch 14. A detailed operation of the controller 15 will be described later.

The motor driver 16 locks or unlocks a door under control of the controller 15.

A configuration of the vehicle door control system according to an embodiment of the present invention has been described above. The communication units constituting the vehicle door control system according to an embodiment of the present invention will be described below in detail.

Figure 2:
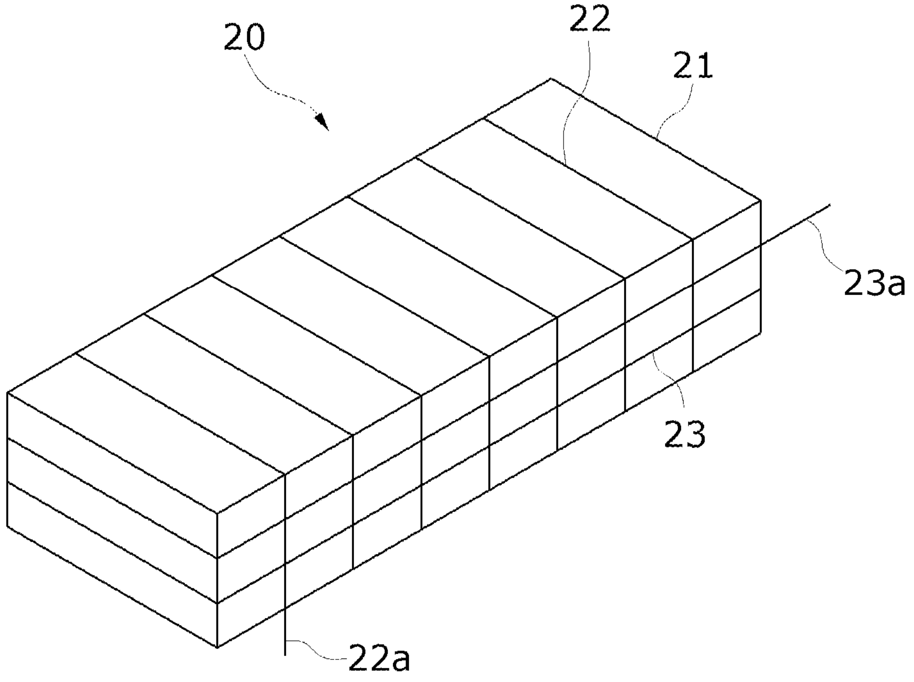
FIG. 2 is a diagram showing an example of an antenna module of a vehicle door control system according to an embodiment of the present invention.
Figure 3:
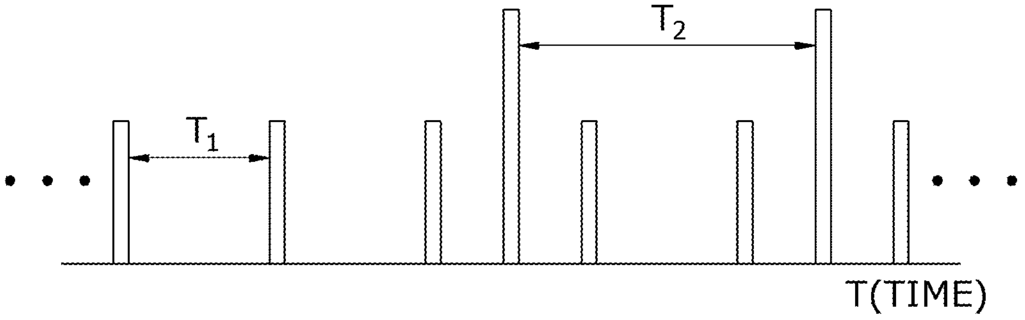
FIG. 3 is a diagram showing transmission intervals of an NFC discovery signal and an LF discovery signal that are transmitted from a vehicle door control system according to an embodiment of the present invention.

FIG. 2 is a diagram showing an example of an antenna module of a vehicle door control system according to an embodiment of the present invention, and FIG. 3 is a diagram showing transmission intervals of an NFC discovery signal and an LF discovery signal that are transmitted from a vehicle door control system according to an embodiment of the present invention.

As described above, a vehicle door control system 1 according to an embodiment of the present invention includes three communication units that perform different types of wireless communication, that is, first, second, and third communication units 11, 12, and 13.

An example in which the first communication unit 11 performs LF communication, the second communication unit 12 performs RF communication, and the third communication unit 13 performs NFC communication will be described below.

In this case, the first, second, and third communication units 11, 12, and 13 are connected with the first, second, and third antennas 17, 18, and 19, respectively, in order to perform communication. The first communication unit 11 is connected with an LF antenna, which is the first antenna 17. The second communication unit 12 is connected with an RF antenna, which is the second antenna 18. The third communication unit 13 is connected with an NFC antenna, which is the third antenna 19.

In particular, according to the present invention, the first and third antennas 17 and 19 are produced in one body to form an antenna module 20. As an example, as shown in FIG. 2, the antenna module 20 may be formed to have a first antenna coil 22 wound on a ferrite core 21 in one direction (i.e., a longitudinal direction) and a third antenna coil 23 wound on the ferrite core 21 in a direction perpendicular to the one direction (i.e., a lateral direction).

An end 22*a* of the first antenna coil 22 is connected with the first communication unit 11, and an end 23*a* of the third antenna coil 23 is connected with the third communication unit 13.

In this case, the antenna module 20 may be formed to have the third antenna coil 23 wound on the ferrite core 21 on which the first antenna coil 22 has already been wound. Also, the antenna module 20 may be formed to have the first antenna coil 22 wound on the ferrite core 21 on which the third antenna coil 23 has already been wound.

Also, since the antenna module 20 has a structure in which the first and third antennas 17 and 19 are formed in one body, the antenna module 20 may be installed at a door handle in which a conventional LF antenna has been installed. Thus, there is no need for additional space for installing the third antenna 19.

The first communication unit 11 transmits an LF signal for discovering a smart key 2 that is located around the vehicle and authenticated (i.e., an LF discovery signal) through the first antenna 17 at certain intervals. The transmission interval of the LF discovery signal refers to an "LF transmission interval."

Also, as a response to the LF discovery signal, the first communication unit 11 receives a response signal from the smart key 2 through the first antenna 17 and delivers the received response signal to the controller 15. According to a request from the controller 15, the first communication unit 11 transmits an authentication request signal to the smart key 2 through the first antenna 17.

The second communication unit 12 receives an RF signal from the smart key 2 through the second antenna 18 and delivers the received RF signal to the controller 15.

The third communication unit 13 transmits an NFC signal for discovering a portable terminal 3 that is positioned around the vehicle and authenticated (i.e., an NFC discovery signal) through the third antenna 19 at certain intervals. The transmission interval of the NFC discovery signal refers to an "NFC transmission interval."

The first and third communication units 11 and 13 may be configured to transmit the LF discovery signal and the NFC discovery signal under control of the controller 15.

In this case, the controller 15 controls the first and third communication units 11 and 13 such that the LF discovery signal and the NFC discovery signal are transmitted at different intervals.

In particular, the controller 15 transmits the NFC discovery signal through the third communication unit 13 a predetermined number of times. When the portable terminal 3 is not discovered while the NFC discovery signal is transmitted a predetermined number of times, the controller 15 transmits the LF discovery signal through the first communication unit 11.

Since the first and third antennas 17 and 19 according to the present invention are formed on one ferrite core, distortion occurs between two signals when the two signals are simultaneously output from the first and third antennas 17 and 19.

As shown in FIG. 3, the NFC transmission interval T1 is set different from the LF transmission interval T2. Preferably, the NFC transmission interval T1 is set shorter than the LF transmission interval T2.

The reason the NFC transmission interval T1 is set shorter than the LF transmission interval T2 is because the NFC discovery signal and the LF discovery signal have different characteristics and different output purposes.

That is, the LF communication is made within about 2 m from a vehicle. Outputting the LF discovery signal by periods is for a welcome light function. A vehicle door control is made based on an input corresponding to a manipulation of the switch 14.

On the other hand, the NFC communication is made within 10 cm. Outputting the NFC discovery signal by periods is for a vehicle door control function. Since the NFC communication is made when a user accesses the vehicle and then immediately tries to control the door, a fast response is required.

The elements and their functions of the vehicle door control system according to an embodiment of the present invention have been described above. An operation of the vehicle door control system according to an embodiment of the present invention will be described below in detail with reference to the accompanying drawings.

First, a process in which the vehicle door control system 1 according to an embodiment of the present invention controls a vehicle door using LF communication and RF communication will be described.

Figure 4:
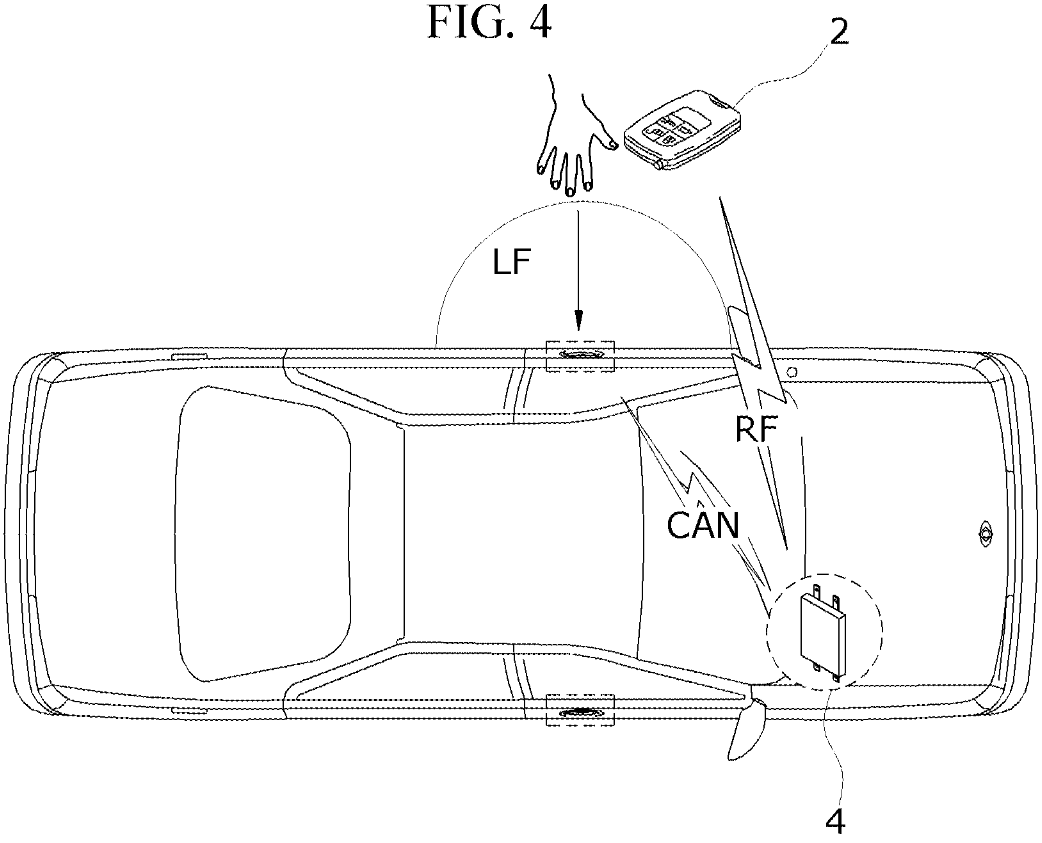
FIG. 4 is a diagram for describing a process in which a vehicle door control system according to an embodiment of the present invention controls a vehicle door using LF communication and RF communication.

FIG. 4 is a diagram for describing a process in which the vehicle door control system 1 according to an embodiment of the present invention controls a vehicle door using LF communication and RF communication.

In an embodiment of the present invention, it is assumed that a user intends to unlock a vehicle door that was initially locked.

Among the elements of the vehicle door control system 1, the first, second, and third communication units 11, 12, and 13 and the controller 15 are collectively referred to as one control module 4.

Referring to FIG. 4, the control module 4 periodically transmits the LF discovery signal on the basis of the LF transmission interval in order to check whether a smart key 2 is present around the vehicle. In detail, the LF communication unit 11 periodically transmits the LF discovery signal through the LF antenna 17.

When the smart key 2 is located within a communicable distance from the control module 4 to receive the LF discovery signal, the smart key 2 transmits a first response signal including an ID through an LF communication unit in response to the received LF discovery signal. In detail, the first response signal is received by the LF communication unit 11 through the LF antenna 17, and the LF communication unit delivers the first response signal to the controller 15.

The control module 4 receives the first response signal and compares the ID included in the first response signal with a preset ID to perform primary authentication on the smart key 2. In detail, a process of performing primary authentication on the smart key 2 may be performed by the controller 15.

When the primary authentication is successful, the control module 4 lights a lamp, for example, one of a puddle lamp of a side mirror and a pocket lamp of a door handle in order to perform a welcome light function. When the primary authentication fails, the control module 4 transmits the LF discovery signal in order to rediscover the smart key 2.

When the primary authentication is successful and a press signal is sent from the switch 14, the control module 4 transmits an authentication request signal to the smart key 2 in order to perform a secondary authentication process for controlling a vehicle door.

In detail, when the press signal is received from the switch 14, the controller 15 instructs the LF communication unit 11 to transmit an authentication request signal, and the LF communication unit 11 transmits the authentication request signal to the smart key 2 through the LF antenna 17.

When the authentication request signal is received, the smart key 2 transmits a second response signal including an ID to the control module 4 through an RF communication unit in response to the authentication request signal. In detail, the second response signal is transmitted to the RF communication unit 12 through the RF antenna 18, and the RF communication unit 12 delivers the second response signal to the controller 15.

When the second response signal is received, the control module 4 compares the ID included in the second response signal with a preset ID to perform secondary authentication on the smart key 2. In detail, a process of performing secondary authentication on the smart key 2 may be performed by the controller 15.

In this case, when the secondary authentication is successful, the control module 4 transmits a door control signal to the motor driver 16 to unlock the vehicle door. In detail, the controller 15 transmits the door control signal to the motor driver 16 through CAN communication.

On the other hand, when the secondary authentication fails, the control module 4 may transmit an authentication request signal to the smart key 2 again in order to perform re-authentication on the secondary authentication. Also, the control module 4 may transmit an LF discovery signal for discovering another smart key 2.

Next, a process in which the vehicle door control system 1 according to an embodiment of the present invention controls a vehicle door using NFC communication will be described.

Figure 5:
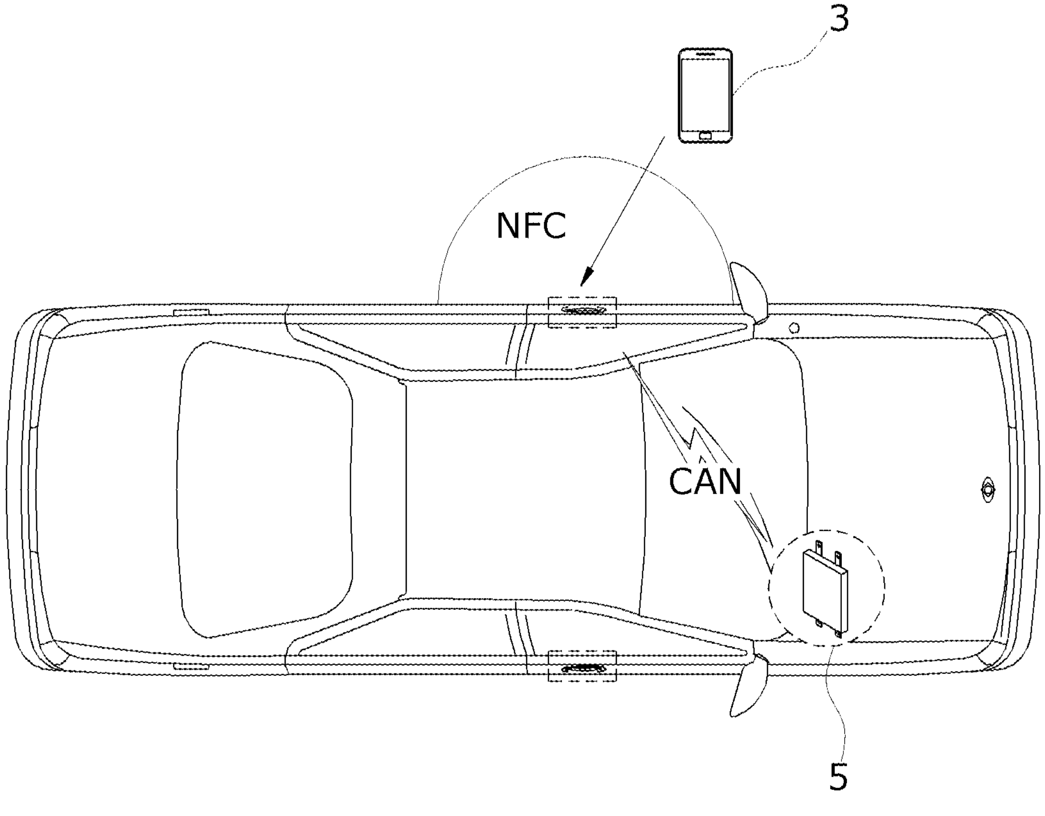
FIG. 5 is a diagram for describing a process in which a vehicle door control system according to an embodiment of the present invention controls a vehicle door using NFC communication.

FIG. 5 is a diagram for describing a process in which the vehicle door control system according to an embodiment of the present invention controls a vehicle door using NFC communication.

In an embodiment of the present invention, it is assumed that a user intends to unlock a vehicle door that was initially locked.

Among the elements of the vehicle door control system 1, the first, second, and third communication units 11, 12, and 13 and the controller 15 are collectively referred to as one control module 5.

Referring to FIG. 5, the control module 5 periodically transmits the NFC discovery signal on the basis of the NFC transmission interval in order to check whether a portable terminal 3 is present around the vehicle. In detail, the NFC communication unit 13 periodically transmits the NFC discovery signal through the NFC antenna 19.

When the portable terminal 3 is located within a communicable distance from the control module 5 to receive the NFC discovery signal, the portable terminal 3 transmits a response signal including an ID through an NFC communication unit in response to the received NFC discovery signal. In detail, the response signal is transmitted to the NFC communication unit 13 through the NFC antenna 19, and the NFC communication unit 13 delivers the response signal to the controller 15.

When the response signal is received, the control module 5 compares the ID included in the response signal with a preset ID to perform authentication on the portable terminal 3. In detail, a process of performing authentication on the portable terminal 3 may be performed by the controller 15.

When the authentication of the portable terminal 3 is successful, the control module 5 transmits a door control signal to the motor driver 16 to unlock the vehicle door. In detail, the controller 15 transmits the door control signal to the motor driver 16 through CAN communication.

On the other hand, when the authentication of the portable terminal 3 fails, the control module 5 may transmit the NFC discovery signal to the smart key 2 again in order to perform re-authentication.

The vehicle door control process of the vehicle door control system according to an embodiment of the present invention has been described above on the basis of an authentication target. The entire operation of the vehicle door control system according to an embodiment of the present invention will be described below.

Figure 6:
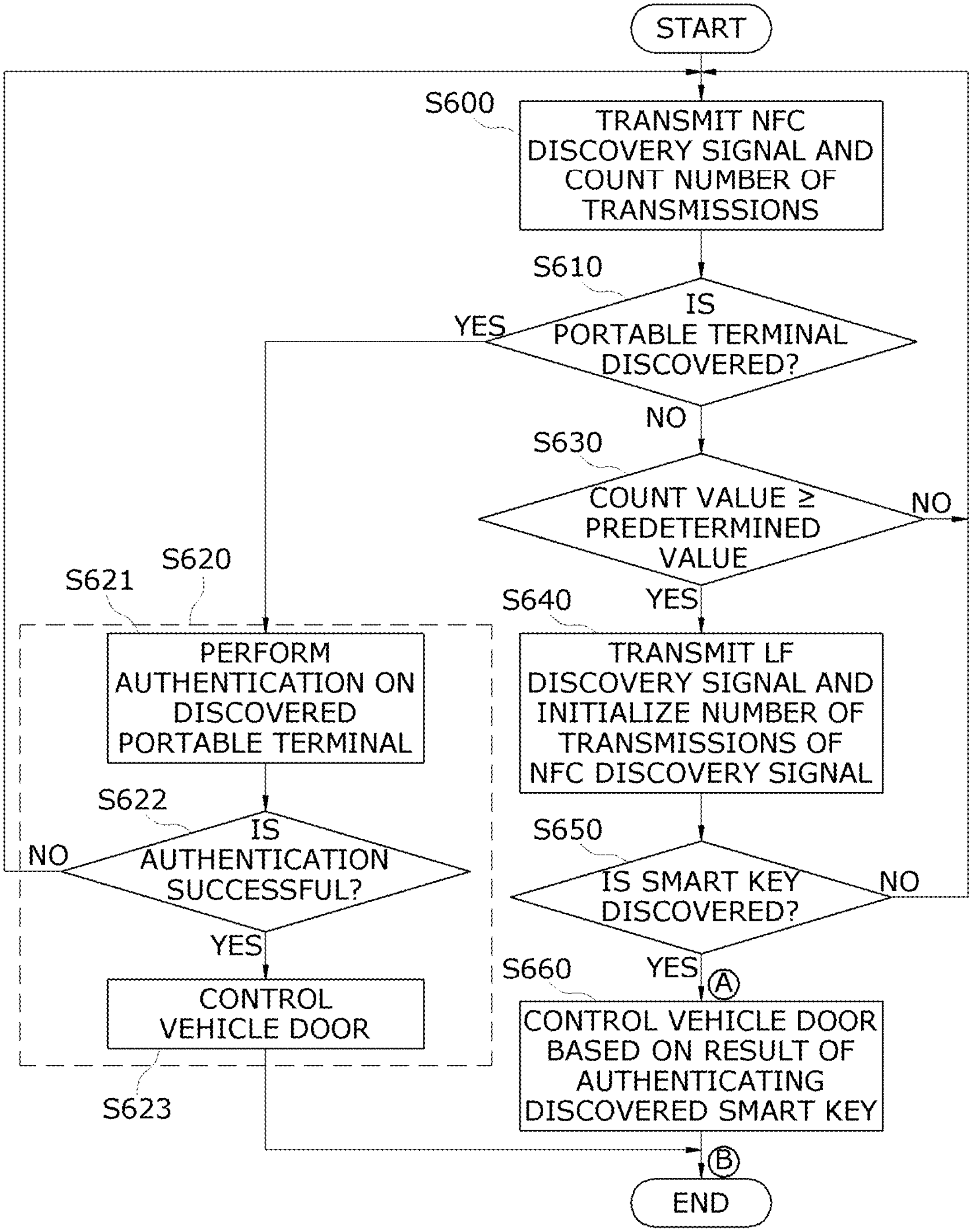
FIGS. 6 and 7 are flowcharts showing sequences of a vehicle door control operation of a vehicle door control system according to an embodiment of the present invention.
Figure 7:
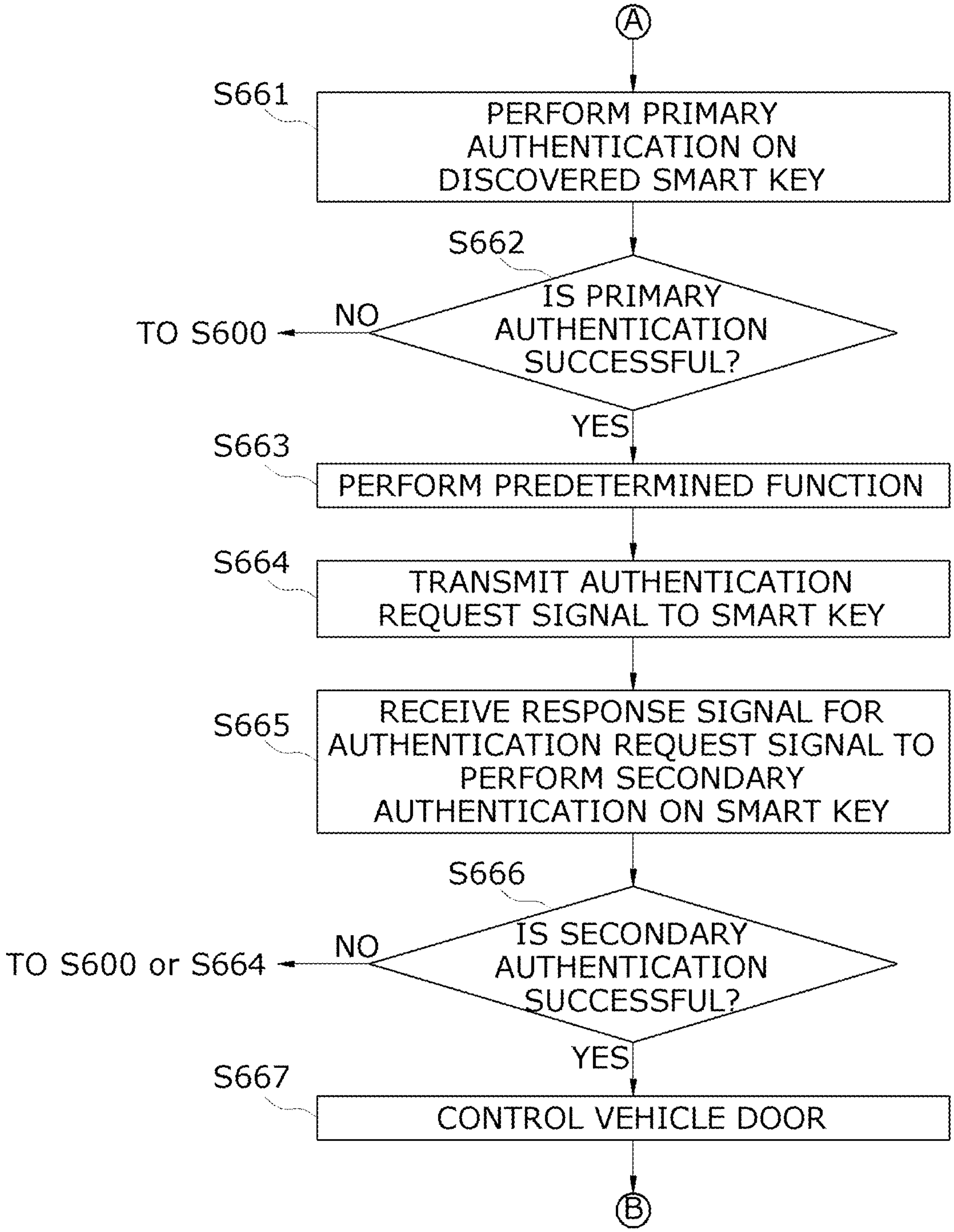

FIGS. 6 and 7 are flowcharts showing a sequence of a vehicle door control operation of a vehicle door control system according to an embodiment of the present invention.

In an embodiment of the present invention, it is assumed that a user intends to unlock a vehicle door that was initially locked.

Referring to FIG. 6, when the vehicle door control system 1 starts to operate, the system 1 transmits an NFC discovery signal through NFC communication according to a predetermined NFC transmission interval and counts the number of transmissions of the NFC discovery signal (S600).

After S600, the system 1 determines whether a portable terminal 3 has been discovered (S610). In this case, the system 1 may determine whether the portable terminal 3 has been discovered on the basis of whether a response signal is received from the portable terminal 3 as a response to the NFC discovery signal.

When it is determined in S610 that the portable terminal 3 has been discovered (yes in S610), the system 1 controls a vehicle door on the basis of a result of authentication of the discovered portable terminal 3 (S620).

In detail, the system 1 performs authentication on the discovered portable terminal 3 (S621), determines whether the authentication is successful (S622), controls the vehicle door (S623) when, from the authentication result, it is determined that the authentication is successful (yes in S622), and feeds back to S600 to output an NFC signal when the authentication has failed (no in S622).

In this case, the system 1 performs authentication on the portable terminal 3 through an operation of comparing an ID included in a response signal transmitted from the portable terminal 3 with a preset ID, determines that the authentication is successful when the two IDs match each other, and determines that the authentication has failed when the two IDs do not match.

On the other hand, when it is determined in S610 that the portable terminal 3 has not been discovered (no in S610), the system 1 determines whether a value counted in S600 (a count value) is equal to or greater than a predetermined value (S630).

When it is determined in S630 that the count value is less than the predetermined value (no in S630), the system 1 feeds back to S600 to output an NFC signal.

On the other hand, when it is determined in S630 that the count value is equal to or greater than the predetermined value (yes in S630), the system 1 transmits an LF discovery signal through LF communication according to a predetermined LF transmission interval and initializes the number of transmissions of the NFC discovery signal (S640).

After S640, the system 1 determines whether a smart key 2 has been discovered (S650). In this case, the system 1 may determine whether the smart key 2 has been discovered on the basis of whether a response signal is received from the smart key 2 as a response to the LF discovery signal.

When it is determined in S650 that the smart key 2 has not been discovered (no in S650), the system 1 feeds back to S600 to transmit the NFC signal.

On the other hand, when it is determined in S650 that the smart key 2 has been discovered (yes in S650), the system 1 controls a vehicle door on the basis of a result of authentication of the discovered smart key 2 (S660).

The step S660 will be described in detail with reference to FIG. 7. The system 1 performs primary authentication on the discovered smart key 2 (S661) and determine whether the authentication is successful (S662).

In this case, the system 1 determines whether the ID included in the response signal transmitted from the smart key 2 matches a preset ID to perform primary authentication on the smart key 2.

When it is determined in S662 that the primary authentication is successful (yes in S662), the system 1 performs a predetermined function, for example, a welcome light function (S663). When it is determined that the primary authentication fails (no in S662), the system 1 feeds back to a predetermined step, for example, S600 to transmit an NFC discovery signal.

After S663, when the switch is pressed, the system 1 transmits an authentication request signal to the smart key 2 through LF communication in order to perform secondary authentication on the smart key 2 (S664).

After S664, the system 1 receives a response signal from the smart key 2 through RF communication as a response to the authentication request signal, performs secondary authentication on the smart key 2 (S665), and determines whether the secondary authentication is successful (S666).

In this case, the system 1 determines whether the ID included in the response signal transmitted from the smart key 2 matches a preset ID to perform secondary authentication on the smart key 2.

When it is determined in S666 that the secondary authentication is successful (yes in S666), the system 1 controls a vehicle door (S667). When it is determined that the secondary authentication fails (no in S666), the system 1 may feed back to a predetermined step, for example, S600 to transmit an NFC discovery signal or may feed back to S664 to transmit an authentication request signal.

The operations shown in FIGS. 6 and 7 should be understood as showing various processes that can be performed by a computer or a processor, regardless of whether the operations can substantially be recorded in a computer-readable medium or a computer or processor has been clearly shown.

Also, the definite use of terms such as "processor," "control" or the like is not to be construed exclusively using hardware that can execute software, and it should be understood as implicitly including, but is not limited thereto, digital signal processor (DSP) hardware and a read-only memory (ROM), a random access memory (RAM), and a nonvolatile memory for storing software, without limitation. It will be appreciated that other well-known hardware may be included.

So far, the vehicle door control system and the operating method thereof according to the present invention have been described according to embodiments. However, the present invention is not limited to an exemplary embodiment. It will be apparent to those skilled in the art that various alternatives, modifications, and variations can be made to the present invention without departing from its spirit and scope.

By using a vehicle door control technology according to an embodiment of the present invention, it is possible to control a vehicle door using NFC communication as well as the conventional LF communication and RF communication.

Accordingly, authentication can be performed using a portable terminal even though a user does not carry a smart key, thus improving user convenience.

Also, since an NFC antenna for the NFC communication and a conventional LF antenna are formed in one body, an antenna module composed of the NFC antenna and the LF antenna can be installed at a door handle, as in the related art.

Accordingly, it is also possible to provide a vehicle door control technology with enhanced performance, compared to the related art, without a space limitation for installing the NFC antenna.

Accordingly, the embodiments and the accompany drawings of the present invention are to be considered descriptive and not restrictive, and do not limit the technical scope of the present invention. The scope of the present invention should be to be construed by the appended claims, and all technical ideas within the scope of their equivalents should be construed as being included in the scope of the present invention.

What is claimed is:

1. A vehicle door control system comprising:

a communication unit configured to wirelessly communicate with a smart key or a portable terminal located around a vehicle;

a controller configured to authenticate the smart key or the portable terminal based on communication with the smart key or the portable terminal, and the controller further configured to output a door control signal when the smart key or the portable terminal is authenticated; and a motor driver configured to lock or unlock a vehicle door according to the door control signal, wherein the communication unit comprises:

a first communication unit configured to perform low frequency (LF) communication with the smart key;

a second communication unit configured to perform radio frequency (RF) communication with the smart key; and a third communication unit configured to perform near field communication (NFC) communication with the portable terminal, an antenna module comprising a first antenna connected to the first communication unit and a third antenna connected to the third communication unit, wherein the controller is configured to control the third communication unit to periodically transmit an NFC discovery signal for discovering the portable terminal in a predetermined number, wherein, when the portable terminal is not discovered in response to the predetermined number of transmissons of the NFC discovery signal for discovering the smart key, the controller is configured to control the first communication unit to periodically transmit an LF discovery signal.

2. The vehicle door control system of claim 1, wherein the controller is configured to control the first communication unit to periodically transmit the LF discovery signal at a first interval, wherein the controller is configured to control the third communication unit to periodically transmit the NFC discovery signal at a second interval.

3. The vehicle door control system of claim 2, wherein the first interval and the second interval are set different from each other, and the second interval is set shorter than the first interval.

4. The vehicle door control system of claim 2, wherein the controller is configured to determine whether an ID included in a response signal transmitted from the portable terminal discovered by the NFC discovery signal matches a preset ID, and further configured to output the door control signal when the two IDs match.

5. The vehicle door control system of claim 1, wherein the first antenna and third antenna are installed at a door handle of the vehicle.

6. The vehicle door control system of claim 1, wherein the first antenna and the third antenna are produced in one body to form an antenna module, wherein the antenna module is formed to have a first antenna coil wound on a ferrite core in one direction and a third antenna coil wound on the ferrite core in another direction.

7. The vehicle door control system of claim 6, wherein the antenna module is formed to have the third antenna coil wound on the ferrite core on which the first antenna coil has already been wound.

8. The vehicle door control system of claim 6, wherein the antenna module is formed to have the first antenna coil wound on the ferrite core on which the third antenna coil has already been wound.

9. A method of operating a vehicle door control system, the method comprising:

periodically transmitting an NFC discovery signal for discovering a portable terminal at a first interval;

counting transmissions of the NFC discovery signal;

determining whether the portable terminal has been discovered;

controlling a vehicle door when it is determined that the portable terminal has been discovered, based on a result of authentication of the discovered portable terminal;

when it is determined that the portable terminal has not been discovered, determining whether the count, of NFC discovery signal transmissions is equal to or greater than a predetermined value;

subsequently, when it is determined that the count is less than the predetermined value, transmitting the NFC discovery signal periodically at the first interval;

when it is determined that the count is queal to or greater than the predetermined value, periodically transmitting an LF discovery signal for discovering a smart key at second interval;

subsequently, determining whether the smart key has been discovered; and when it is determined that the smart key has been discovered, controlling the vehicle door, based on a result of authentication of the discovered smart key.

10. The method of claim 9, wherein determining whether the portable terminal has been discovered is performed based on whether a response signal transmitted by the portable terminal that has received the NFC discovery signal is received.

11. The method of claim 9, wherein the controlling of a vehicle door comprises:

performing authentication on the discovered portable terminal;

determining whether the authentication is successful from the authentication result; and controlling the vehicle door when it is determined that the authentication is successful.

12. The method of claim 9, wherein performing authentication on the discovered portable terminal comprises comparing an ID included in a response signal transmitted from the portable terminal that has received the NFC discovery signal with a preset ID.

13. The method of claim 9, further comprising transmitting the NFC discovery signal at every first interval when it is determined that the smart key has not been discovered.

* * * * *